US005752275A

United States Patent [19]
Hammond

[11] Patent Number: 5,752,275
[45] Date of Patent: May 12, 1998

[54] TRANSLATION LOOK-ASIDE BUFFER INCLUDING A SINGLE PAGE SIZE TRANSLATION UNIT

[75] Inventor: Gary N. Hammond, Campbell, Calif.

[73] Assignee: Intel Corporation, Santa Clara, Calif.

[21] Appl. No.: 893,085

[22] Filed: Jul. 14, 1997

Related U.S. Application Data

[63] Continuation of Ser. No. 414,206, Mar. 31, 1995, abandoned.

[51] Int. Cl.⁶ .................................................. G06F 12/10
[52] U.S. Cl. .............................. 711/207; 711/212; 711/128
[58] Field of Search ................................. 711/207, 212, 711/128

[56] References Cited

U.S. PATENT DOCUMENTS

| | | | |
|---|---|---|---|
| 4,340,932 | 7/1982 | Bakula et al. | 711/2 |
| 4,654,777 | 3/1987 | Nakamura | 711/206 |
| 4,669,043 | 5/1987 | Kaplinsky | 711/3 |
| 4,763,244 | 8/1988 | Moyer et al. | 711/206 |
| 4,763,250 | 8/1988 | Keshlear et al. | 711/208 |
| 4,792,897 | 12/1988 | Gotou | 711/207 |
| 4,835,734 | 5/1989 | Kodaira et al. | 711/209 |
| 4,972,338 | 11/1990 | Crawford et al. | 711/206 |
| 4,979,098 | 12/1990 | Baum et al. | 711/208 |
| 4,980,816 | 12/1990 | Fukuzawa et al. | 711/207 |
| 5,023,777 | 6/1991 | Sawamoto | 711/2 |
| 5,058,003 | 10/1991 | White | 711/209 |
| 5,060,137 | 10/1991 | Bryg et al. | 395/243 |
| 5,179,674 | 1/1993 | Williams et al. | 711/204 |
| 5,263,140 | 11/1993 | Riordan | 711/207 |
| 5,278,963 | 1/1994 | Hattersley et al. | 711/204 |
| 5,412,787 | 5/1995 | Forsyth et al. | 711/207 |
| 5,418,975 | 5/1995 | Babaian et al. | 395/800.24 |
| 5,442,766 | 8/1995 | Chu et al. | 711/204 |
| 5,465,337 | 11/1995 | Kong et al. | 711/207 |
| 5,475,827 | 12/1995 | Lee et al. | 711/207 |
| 5,493,660 | 2/1996 | DeLano et al. | 711/206 |
| 5,526,504 | 6/1996 | Hsu et al. | 711/207 |

FOREIGN PATENT DOCUMENTS

| | | |
|---|---|---|
| 0113240 | 12/1983 | European Pat. Off. . |
| 1595740 | 5/1978 | United Kingdom . |
| 2127994 | 6/1983 | United Kingdom . |

OTHER PUBLICATIONS

Kane, et al., "MIPS RISC Architecture", Prentice Hall, Englewood Cliffs, New Jersey, Ch 6, 57 Pages, Ch 4, 30 Pages (1992).

Pentium Processor User's manual. vol.3, Architecture and Programming Manual. Intel Corporation 1993, pp. 11–1—11–25.

Tom Shanley and Don Anderson, *ISA System Architecture* (1993), Mindshare Press, pp. 137 through 156.

"SPARC Reference MMU Architecture", The SPARC™ Architecture Manual Version 8, Sun Microsystems, Inc.: Dec. 11, 1990, pp. 237–255.

"Chapter 6: Memory Achitecture: Paging", The 80386 Book, Microsoft Press, Nelson, Ross P., 1988, pp. 125–134.

"Chapter 5: Memory Management", i486™ Processor Programmer's Reference Manual, Intel Corporation Literature Sales, P.O. Box 7641, Mt. Prospect, Ill 60056–7641, 1990, pp. 5–1 through 5–25.

(List continued on next page.)

*Primary Examiner*—Eddie P. Chan
*Assistant Examiner*—Reginald G. Bragdon
*Attorney, Agent, or Firm*—Blakely, Sokoloff, Taylor & Zafman

[57] ABSTRACT

A method and apparatus for use in a computer system to translate virtual addresses into translated addresses. According to one aspect of the invention, a dynamically configurable translation unit is provided. Based on a value stored in a storage area, the dynamically configurable translation unit configures itself to support the single page size identified by the value. In one computer system, the dynamically configurable translation unit is used in conjunction with a multiple page size translation unit.

20 Claims, 7 Drawing Sheets

OTHER PUBLICATIONS

"i860™ XP Microprocessor", i860 XP Microprocessor Data Book, Intel Corporation Literature Sales, P.O.Box 7641, Mt. Prospect, Ill 60056-7641, pp. 21-27, 1991.

"Chapter 3: Logical To Physical Address Translation", Data General MV 2000, pp. 32-37, (publication information unknown).

"Chapter 4: Addressing", i860™ Microprocessor Family Programmer's Reference Manual, Intel Corporation Literature Sales, P.O. Box 7641,Mt. Prospect, Ill 650056-7641, pp. 1-13, 1991.

"Computer Architecture A Quantative Approach," Patterson, David A. & Hennessey, John L., Morgan Kaufman Publishers, Inc., San Mateo, California, pp. 432-485, 1990.

"Chapter 9, Case Study, The MIPS R2000", Computer Architectrue Case Studies, Robert J. Barron & Lee Higbie, 1992, pp. 223 & 229.

TRANSLATION LOOK-ASIDE BUFFER INCLUDING A SINGLE PAGE SIZE TRANSLATION UNIT

This is a continuation of application Ser. No. 08/414,206, filed Mar. 31, 1995, now abandoned.

BACKGROUND OF THE INVENTION

1. Field of the Invention

The invention relates to the field of computer systems. More specifically, the invention relates to the area of memory management.

2. Background Information

Memory addressing schemes often use a technique called paging to implement virtual memory. When using paging, the virtual address space (i.e., the address space generated by either the execution unit of a processor or by the execution unit in conjunction with a segmentation unit of a processor) is divided into fix sized blocks called pages, each of which can be mapped onto any of the physical addresses (i.e., the addresses which correspond to hardware memory locations) available on the system. In a typical computer system, a memory management unit determines and maintains, according to a paging algorithm, the current mappings for the virtual to physical addresses using page tables. Upon receiving a virtual address from the execution unit of a processor, the memory management unit translates the virtual address into its corresponding physical address using the page tables.

In one implementation, the page tables are accessed using a page directory. Each virtual address includes three portions: a directory portion, a table portion, and an offset portion. The directory portion is an offset into the page directory, which is held in main memory. The base-address of this page directory is held in a control register. The processor adds the base-address to the directory portion to get the address of the appropriate directory entry. Each directory entry stores the base-address of a page table, which is also held in main memory. The processor finds the address of the appropriate page-table entry by adding the table portion (from the virtual address) to the page-table-base address (from the directory entry). Each page-table entry stores the base-address of a page-frame. Finally, the processor finds the virtual address' corresponding physical address by adding the offset portion (from the virtual address) to the page-frame-base address (from the page-table entry).

Since the page tables are in main memory, accessing them is time consuming. To speed up the paging translations, certain of the translations are stored in a translation look-aside buffer or TLB (a faster memory which is preferably located on the processor). Upon generating a virtual address requiring translation, the memory management unit first searches for the translation in the TLB before accessing the paging algorithm and page tables.

Each translation stored in the TLB contains a virtual address portion and a physical address portion. To determine if a translation corresponds to a virtual address, the directory and table portions of the virtual address are compared to the virtual address portion of the translation. If they do not match, the translation does not correspond to the virtual address. However, if they match, the translation corresponds to the virtual address. If the translation corresponds to the virtual address, the physical address portion of the translation is concatenated with the offset portion of the virtual address to generate the virtual address' corresponding physical address. Further explanation of paging schemes is provided in Shanley, Tom and Anderson, Don, *ISA System Architecture*, published by MindShare, Inc., 1993.

One method for implementing a memory management unit is to hardwire the paging translation algorithm in the processor. A second method for implementing a memory management unit is to allow the paging translation algorithm to be determined by the operating system (i.e., a software translation). According to this second method, if during the execution of a process a virtual address is generated whose translation is not installed in the TLB, a TLB miss fault is generated. In response to the TLB miss fault, the processor interrupts the execution of the current process, stores the interrupted process' execution environment (i.e., the information necessary to resume execution of the interrupted process), and invokes an operating system handler (referred to herein as the TLB handler) to perform the paging translation. Upon completion of the TLB handler, the processor resumes execution of the interrupted process.

Some memory management units support multiple page sizes—i.e., the pages into which the virtual address space is divided can be of different sizes. One commercially available processor supports two page sizes by including a TLB that has two parallel structures. One structure performs translations for one page size, while the other structure performs translations for the other page size. To determine if a translation for a virtual address in stored in the TLB, the processor checks both structures in parallel. Each of these structures is implemented using a set associative cache (also termed as set-indexed cache) hardwired on the processor. It is well known that a set associative cache can have one or more ways (also termed as banks). To determine if a translation for a virtual address is stored in a set associative cache, only one entry per way needs to be checked. The set associative caches used for the TLB in this prior art processor lack flexibility in that they can each support only their predetermined page size. As a result, the approach used in this processor requires a TLB having n parallel structures for n page sizes.

In contrast, another commercially available processor supports multiple page sizes using a TLB containing a fully associative cache. By using a fully associative cache, this processor supports multiple page sizes using a single structure. However, to determine if a translation for a virtual address is stored in a fully associative cache, each entry in the fully associative cache must be checked. As a result, a fully associative cache has a lower density (i.e., can store less translations) than a set associative cache of the same size due to the extra circuitry required to check, in parallel, every entry in the cache.

SUMMARY

A method and apparatus for use in a computer system to translate virtual addresses into translated addresses. According to one aspect of the invention, a dynamically configurable translation unit is provided. Based on a value stored in a storage area, the dynamically configurable translation unit configures itself to support the single page size identified by the value. According to another aspect of the invention, a computer system contains both the dynamically configurable translation unit and a multiple page size translation unit.

According to another aspect of the invention, the dynamically configurable translation unit includes a selector unit that selects an appropriate part of a virtual address based on the single page size being supported. The selected part of the virtual address is used to index an entry in a cache unit. The indexed entry in the cache unit is used to store a translation. The dynamically configurable translation unit also includes a comparing unit that also selects a second part of the virtual address based on the single page size being supported. The comparing unit compares the second part of the virtual address with the translation found in the indexed entry to determine if there is a translation hit. If there is a translation hit, the combining unit combines the appropriate parts of the translation and virtual address to generated a location in a translated address space.

According to yet another aspect of the invention, a translation look-aside buffer in a computer system includes a set associative cache and a fully associated cache. The set associative cache is used for storing address translations for a single page size, while the fully associative cache is used for simultaneously storing address translation for multiple page sizes. In one embodiment of this computer system, the set associative cache is part of a dynamically configurable translation unit.

According to yet another aspect of the invention, a translation look-aside buffer in a computer system includes two separate translation units for respectively storing translations for multiple pages sizes and a single page size. In addition, the second translation unit stores the virtual to physical address translations for the single page size in a storage device coupled to the processor.

BRIEF DESCRIPTION OF THE DRAWINGS

The invention may best be understood by referring to the following description and accompanying drawings which illustrate the invention. In the drawings.

DETAILED DESCRIPTION

A method and apparatus for translating virtual addresses into physical addresses are described which provide for multiple page sizes, while having a high density and a low look-up penalty (i.e., the time required to determine a translation). In the following description, numerous specific details are set forth to provide a thorough understanding of the invention. However, it is understood that the invention may be practiced without these specific details. In other instances, well-known circuits, structures and techniques have not been shown in detail in order not to unnecessarily obscure the invention. For example, the invention will be described with reference to one-way caches so as not to obscure the invention. However, alternative embodiments could be implemented to include multiple-way associative caches.

Overview

In one embodiment, the TLB includes two structures: a preferred page size translation unit and a multiple page size translation unit. The multiple page size translation unit includes a fully associative cache which is implemented to allow each entry in the cache to be checked in parallel—e.g., to allow the virtual address portion and page size of each translation in the cache to be checked in parallel. Using this cache, the multiple page size translation unit stores translations for the different page sizes supported by the processor. In contrast, the preferred page size translation unit acts as a set associative cache which supports a selected one (referred to herein as the "preferred page size") of the multiple page sizes supported by the processor. Since the preferred page size translation unit acts as a set associative cache, it has a higher capacity than fully associative caches. The preferred page size translation unit may be implemented using hardware, microcode, and/or software and may be implemented to cache the translations in a storage area on the processor or off the processor. Typically, the most common page size of the multiple page sizes supported by the processor is selected as the preferred page size. By using the combination of a fully associative cache and a set associative cache, the invention can provide a higher density than either a TLB having parallel set associative caches (one for each page size) or a TLB having only a fully associative cache.

Additionally, the preferred page size translation unit is implemented such that the page size it supports can be selected by the operating system—e.g., the preferred page size translation unit is dynamically configurable to support any one of a number of page sizes. The operating system selects the preferred page size by setting bits in a TLB default register. As later described, the preferred page size translation unit then configures itself such that it supports the selected page size. In addition, during operation of the computer system, the operating system can flush the preferred page size translation unit and change the currently selected preferred page size to a different page size to optimize the performance of different applications. In this manner, software developers are allowed the flexibility of selecting the appropriate page size to optimize the operation of their operating system and other software.

Research shows that execution of typical operating system routines and applications is optimized using a single, smaller page size (e.g., 4K 8K, 16K, etc.), while functions such as frame buffers and I/O are optimized using larger page sizes (e.g., 4M, 16M, 256M). In one implementation, the operating system sets the preferred page size to be a small page size (e.g., 4K, 16K etc.) and executes itself and other applications using this page size. However, the operating system uses other larger page sizes for frame buffers, I/O, etc.

One Embodiment of the Invention

Figure 1:
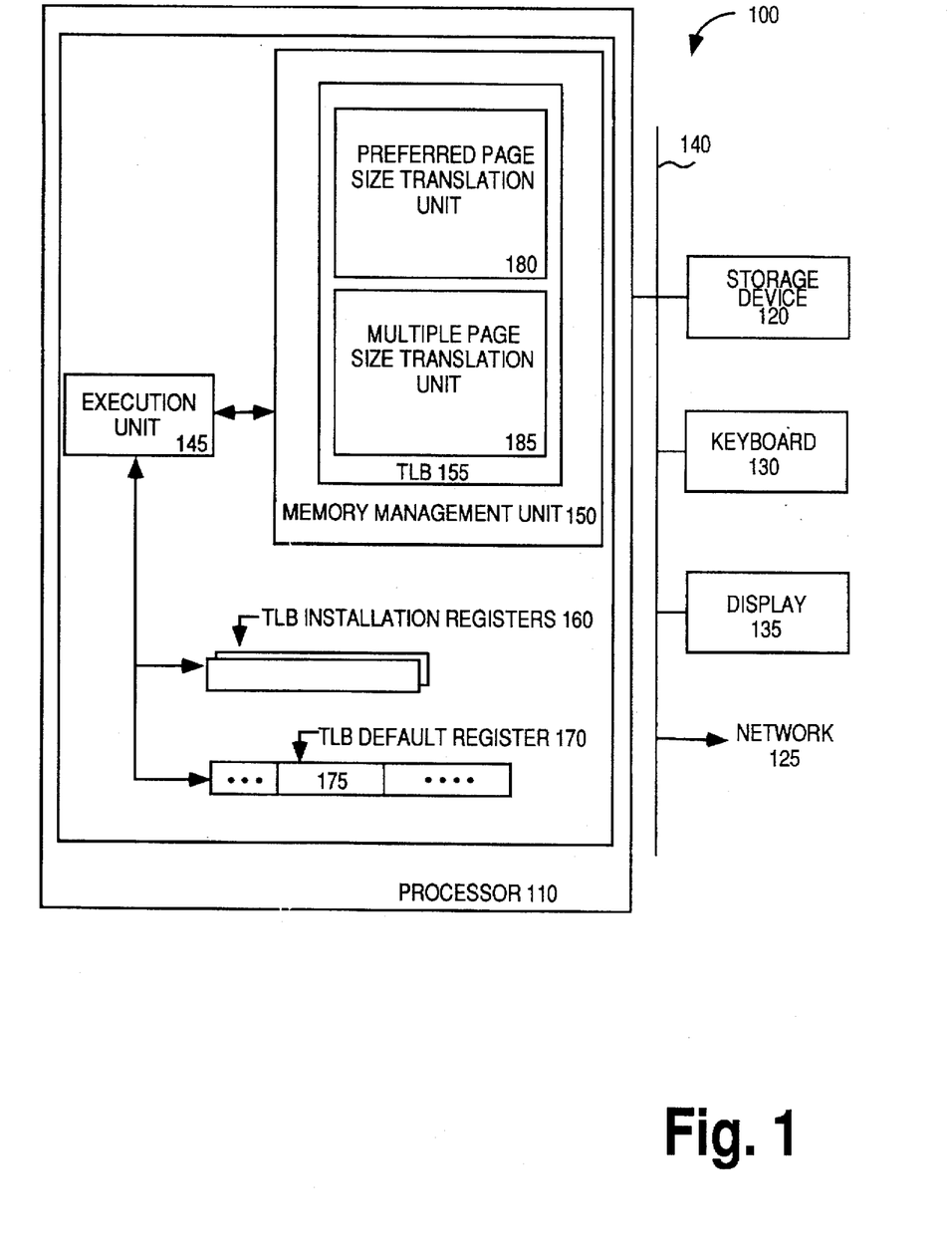
FIG. 1 is a block diagram illustrating an exemplary computer system 100 incorporating the teachings of the invention.

FIG. 1 is a block diagram illustrating an exemplary computer system 100 incorporating the teachings of the invention. The exemplary computer system includes a processor 110, a storage device 120, a network 125, and a bus 140. Processor 110 is coupled to storage device 120 and network 125 by bus 140. In addition, a number of user input/output devices, such as a keyboard 130 and a display 135, are also coupled to bus 140. Processor 110 represents a central processing unit of any type of architecture, including a CISC or RISC type architecture. Storage device 120 represents one or more mechanisms for storing data. For example, storage device 120 may include read only memory (ROM), random access memory (RAM), magnetic disk storage mediums, optical storage mediums, and/or flash memory devices. While one embodiment will be described in which the invention is implemented in a single processor computer system, the invention could be implemented in a multi-processor computer system.

FIG. 1 also illustrates that processor 110 includes an execution unit 145, a memory management unit 150, TLB installation registers 160, and a TLB default register 170. Of course, processor 110 contains additional circuitry which is not shown so as to not obscure the invention.

TLB default register 170 is used for storing information concerning the operation of memory management unit 150. TLB default register 170 includes a number of bits which make up a preferred page size indication 175. In one embodiment, an operating system executing on computer system 100 stores preferred page size indication 175 as a "hint" to indicate which of the multiple page sizes should be selected as the preferred page size. As described, processor 110 supports a 4K page size, an 8K page size, and a 16K page size. However, alternative embodiments could support more, less, and/or different page sizes (e.g., an alternative embodiment could include a 4M page size). While the indication identifying the preferred page size is described as a number of bits, alternative embodiments could store this indication any number of ways, (e.g., off chip, hardwired, and/or using a single bit).

Memory management unit 150 includes a TLB 155 and supports the mapping of virtual memory addresses to physical memory addresses using a software TLB handler (not shown). While one embodiment is described in which memory management unit 150 utilizes a software translation algorithm, alternative embodiments could implement the memory management unit in any number of ways, including a hardwired paging translation circuit.

TLB 155 is used for speeding up the translation of virtual memory addresses into translated memory addresses. While these translated memory addresses are described herein as physical memory addresses, in alternative embodiments these translated memory addresses could be used for any number of purposes. For example, further translations could be performed on these translated memory addresses before physical addresses are achieved. In addition, while one embodiment is described in relation to translating a virtual memory address space, alternative embodiments could use the invention to assist in the translation of any type of addresses. TLB 155 includes a preferred page size translation unit 180 and a multiple page size translation unit 185. Preferred page size translation unit 180 dynamically configures to support the page size indicated by preferred page size indication 175. For example, if preferred page size indication 175 was altered by the operating system to indicate a 4K page size, preferred page size translation unit 180 would configure itself to support a 4K page size. Preferred page size translation unit 180 will be further described with reference to FIGS. 2, 3 and 7. Multiple page size translation unit 185 is preferably implemented using a fully associative cache which allows each entry in the cache to be checked in parallel.

While one embodiment has been described which contains preferred page size translation unit 180, alternative embodiments could be implemented which do not include preferred page size translation unit 180. Such an alternative embodiment would include TLB default register 170 to maintain compatibility, but would not take the "hint" provided by the operating system in preferred page size indication 175 because the necessary circuitry is not provided.

TLB installation registers 160 are used for installing translations in TLB 155. To install a translation in TLB 155, the TLB handler executing on processor 110 stores the translation in TLB installation registers 160 and issues a command requesting processor 110 to install the translation in TLB 155. In response to this command, processor 110 preferably stores the translation contained in TLB installation registers 160 in both preferred page size translation unit 180 and multiple page size translation unit 185. While this embodiment will be described in relation to a single TLB, alternative embodiments could use a first TLB for a code and a second TLB for data. TLB installation registers 160 preferably includes three registers: 1) a first register for storing the virtual address portion of a translation; 2) a second register for storing the physical address portion of a translation; and 3) a third register for storing control information, such as the translation's page size.

Figure 2:
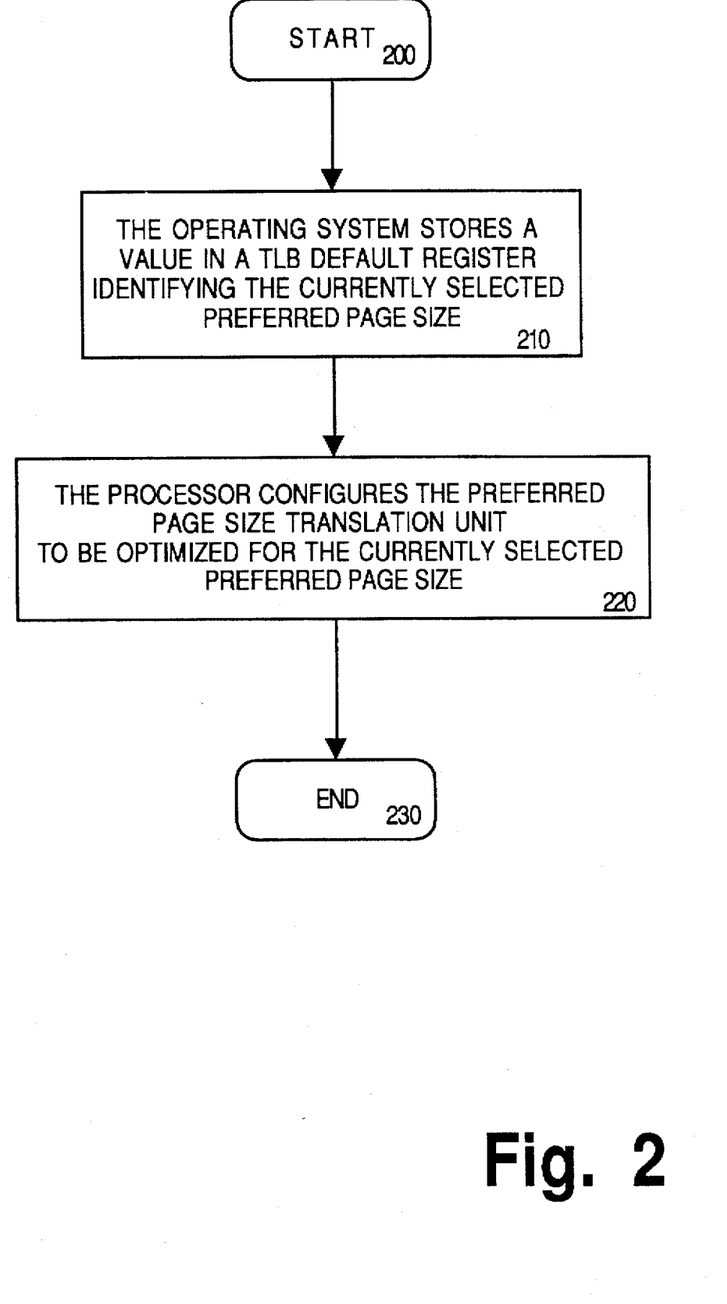
FIG. 2 illustrates a flow diagram for the selection of the preferred page size according to one embodiment of the invention.

FIG. 2 illustrates a flow diagram for the selection of the preferred page size according to one embodiment of the invention. As shown in step 210, the operating system executing on processor 110 stores a value identifying the current preferred page size in a TLB default register and flow passes to step 220. To provide an example, assume the operating system alters preferred page size indication 175 in TLB default register 170 to identify the 4K page size as the currently preferred page size.

At step 220, the processor configures the preferred page size translation unit to be optimized for the preferred page size and flow passes to step 230. In the present example, processor 110 configures the preferred page size translation unit 180 to support a 4K page size.

Figure 3:
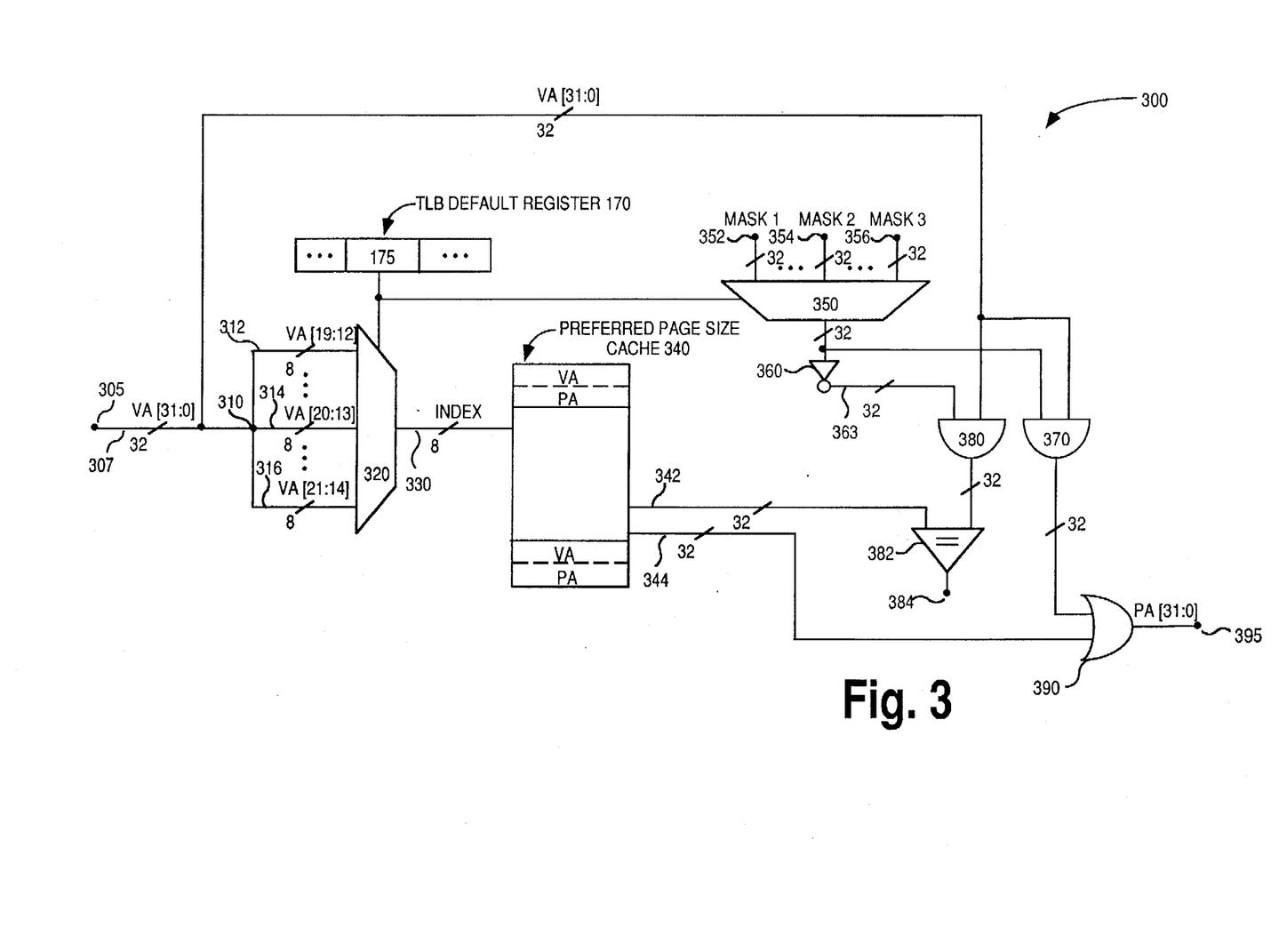
FIG. 3 illustrates one embodiment of the preferred page size translation unit of FIG. 2 which supports a 4K, 8K and 16K page size.

FIG. 3 shows one embodiment of the preferred page size translation unit of FIG. 2 which supports a 4K, 8K and 16K page size. Below, Table 1 illustrates the bit locations used for a virtual page number portion and an offset portion of a 32-bit virtual address for the 4K, 8K, and 16K page size. While one embodiment is described which uses 32 addressing bits, alternative embodiments could use any number of addressing bits (e.g., 64 addressing bits). The use of the virtual page number portion is determined by the TLB handler. For example, the TLB handler can be implemented to maintain a single page table or to maintain both a directory and a set of page tables. Table 1 also illustrates the masks which are used for the 4K, 8K, and 16K page sizes to select either the offset portion or the virtual page number portion of the virtual address requiring translation. As an example, if a 4K page size is being used, ANDing the mask "00 00 0F FF" with a virtual address will generate the offset portion of that virtual address.

TABLE 1

| PAGE SIZE | VIRTUAL ADDRESSES | MASK |
|---|---|---|
| 4K | 31　　　　　　　12 11　　　0<br>\| Virtual Page Number \| Offset \| | 00 00 0F FF |
| 8K | 31　　　　　　　13 12　　　0<br>\| Virtual Page Number \| Offset \| | 00 00 1F FF |
| 16K | 31　　　　　　　14 13　　　0<br>\| Virtual Page Number \| Offset \| | 00 00 3F 00 |

The embodiment shown in FIG. 3 includes a cache that can store 256 entries. As a result, 8 address bits are required to access the entries of this cache. However, alternative embodiments could use a different size cache requiring a different number of addressing bits.

FIG. 3 shows a node 305 representing 32 address lines for receiving a 32 bit virtual address. The 32 lines represented by node 305 are coupled to a node 310. At node 310, the 32 address lines are split and/or spliced into three sets of address lines represented by line 312, line 314, and line 316. Each of lines 312, 314, and 316 carry the address bits used as an index into the cache for the 4K, 8K and 16K page size, respectively. Line 312 represents the address lines containing bits 19 through 12 of a virtual address asserted at node 305 (i.e., the eight bits following the offset portion of the virtual address for the 4K page size). Line 314 represents the address lines containing bits 20 through 13 of the virtual address asserted at node 305 (i.e., the eight bits following the offset portion of the virtual address for the 8K page size). Line 316 represents the address lines containing bits 21 through 14 of virtual address asserted at node 305 (i.e., the eight bits following the offset portion of the virtual address for the 16K page size). Line 312, line 314, and line 316 are each coupled as the inputs into a multiplexor 320. While one embodiment is described in which certain address bits are used to form the index into the cache, alternative embodiments could use different bits of the virtual address.

Multiplexor 320 has a single output of 8 address lines represented by line 330. Multiplexor 320 also has a control input for receiving a control signal identifying the currently selected preferred page size. Based on this control signal, multiplexor 320 selects the bits asserted on one of the sets of address lines represented by lines 312, 314, and 316 to be transmitted on output line 330. In this manner, the bits of a virtual address asserted at node 305 to be used as the index into a preferred page size cache 340 are selected based upon the currently selected preferred page size.

While circuitry for selecting the address bits to be used as the index into preferred page size cache 340 has been described, alternative embodiments could use different circuitry. For example, one alternative embodiment uses an 8-bit shift register in place of multiplexor 320. In this embodiment, circuitry is included which shifts the appropriate bits of the virtual address (i.e., the bits of the virtual address to be used as the index into preferred page size cache 340) into this shift register based on the previously described control signal identifying the currently selected preferred page size. For example, if the 16K page size is the currently selected preferred page size, VA[21:14] would be shifted into this shift register. The output of this shift register is coupled to preferred page size cache 340.

Preferred page size cache 340 is a set associative cache storing in each entry a translation. Each translation includes a virtual address portion and a physical address portion. In addition, each translation preferably includes a control information portion. Preferred page size cache 340 has an input coupled to line 330, as well as two outputs coupled to lines 342 and 344, respectively. Lines 342 and 344 each represent 32 address lines. In response to receiving an index on line 330, preferred page size cache 340 selects the entry corresponding to that index. The virtual address and the physical address portions of the translation stored in that entry are asserted on the address lines represented by line 342 and line 344, respectively. The address lines represented by line 342 are coupled to the inputs of a comparator 382, while the address lines represented by line 344 are each coupled to the input of a corresponding one of 32 OR gates represented by OR gate 390.

FIG. 3 also shows a multiplexor 350, which is used for selecting the appropriate mask for the currently selected page size. A line 352, a line 354, and a line 356 are each coupled as the inputs into multiplexor 350. Lines 352, 354 and 356 each represent 32 address lines on which the 4K mask, the 8K mask, and the 16K mask from Table 1 are respectively asserted. Multiplexor 350 has a control input for receiving the signal identifying the preferred page size. Based on this control signal, multiplexor 350 transmits at its output (a set of 32 address lines) the mask asserted on one of the sets of address lines represented by lines 352, 354, and 356. In this manner, the mask to be used in conjunction with the currently selected preferred page size is chosen. For example, if the 4K page size was selected, the output of multiplexor 350 would be "00 00 0F FF".

Each of the 32 address lines transmitting the output of multiplexor 350 is coupled to a corresponding one of the 32 inverters represented by inverter 360. Thus, the output of these inverters represents the logical inversion of the mask for the currently selected page size. For example, if the 4K page size was selected, the output of these inverters would be "FF FF F0 00". The output of each inverter represented by inverter 360 is coupled to the first input of a corresponding one of 32 AND gates represented by AND gate 380. The second input of each of the AND gates represented by AND gate 380 is coupled to a corresponding one of the address lines represented by line 307, such that the address lines carrying the same bit locations in the virtual address asserted at node 305 and the selected mask are ANDed together. In this manner, the offset portion of the virtual address asserted at node 305 is masked out. Thus, in the present example, if the virtual address asserted at node 305 was "11100011 10001110 00111000 11100011", the output from these AND gates would be "11100011 10001110 00110000 00000000".

The output of the AND gates represented by AND gate 380 and the address lines represented by line 342 are coupled to inputs of comparator 382. Comparator 382 compares the signals outputted from the AND gates represented by AND gate 380 (i.e., the virtual page number portion of the virtual address asserted at node 305) and the signal asserted on the address lines represented by line 342 (i.e., the virtual address portion of the translation). If these signals match, the indexed translation corresponds to the virtual address asserted at node 305 and comparator 382 transmits to a node 384 a signal indicating such—i.e., a TLB hit. In contrast, if these signals do not match, comparator 382 transmits to node 384 a signal indicating the translation for the virtual address asserted at node 305 is not contained in the preferred page size cache 340—i.e., a TLB miss.

Each of the address lines which carry the output from multiplexor 350 are also coupled to a corresponding one of 32 AND gates represented by AND gate 370. The other input of each of these AND gates is coupled to a corresponding one of the address lines represented by line 307, such that corresponding bit locations in the virtual address asserted at node 305 and the currently selected mask are ANDed together. Thus, the output of these AND gates is the offset portion of the virtual address asserted at node 305. For example, if the 4K page size is the currently selected page size and the virtual address asserted at node 305 is "11100011 10001110 00111000 1110001", the output from these AND gates is "00000000 00000000 00001000 1110001". The output of each of the AND gates represented by AND gate 370 is coupled to the other input of a corresponding one of the 32 OR gates represented by OR gate 390. The outputs of the OR gates represented by OR gate 390 are coupled to the 32 address lines represented by node 395. Thus, these OR gates receive the physical address portion of the translation and the offset portion of the virtual address asserted at node 305. As a result, the output of these OR gates is a physical address—i.e., the physical address portion of the translation concatenated with the offset portion of the virtual address asserted at node 305.

The physical address asserted at node 395 is the physical address corresponding to the virtual address asserted at node 305 if the virtual address asserted on the address lines represented by line 342 corresponds to the virtual address asserted at node 305. Therefore, circuit 300 is implemented such that if the signal asserted at node 384 indicates the translation is stored in preferred page size cache 340 (i.e., a TLB hit), the physical address asserted at node 395 will be the address corresponding to the virtual address asserted at node 305.

Thus, the circuit described with reference to FIG. 3 dynamically configures to support the page size identified by the control signal received at the control input of both multiplexor 320 and multiplexor 350. In this manner, this preferred page size translation unit provides high density. In addition, this preferred page size translation unit offers the flexibility of allowing the processor to select the most advantageous page size.

Figure 4:
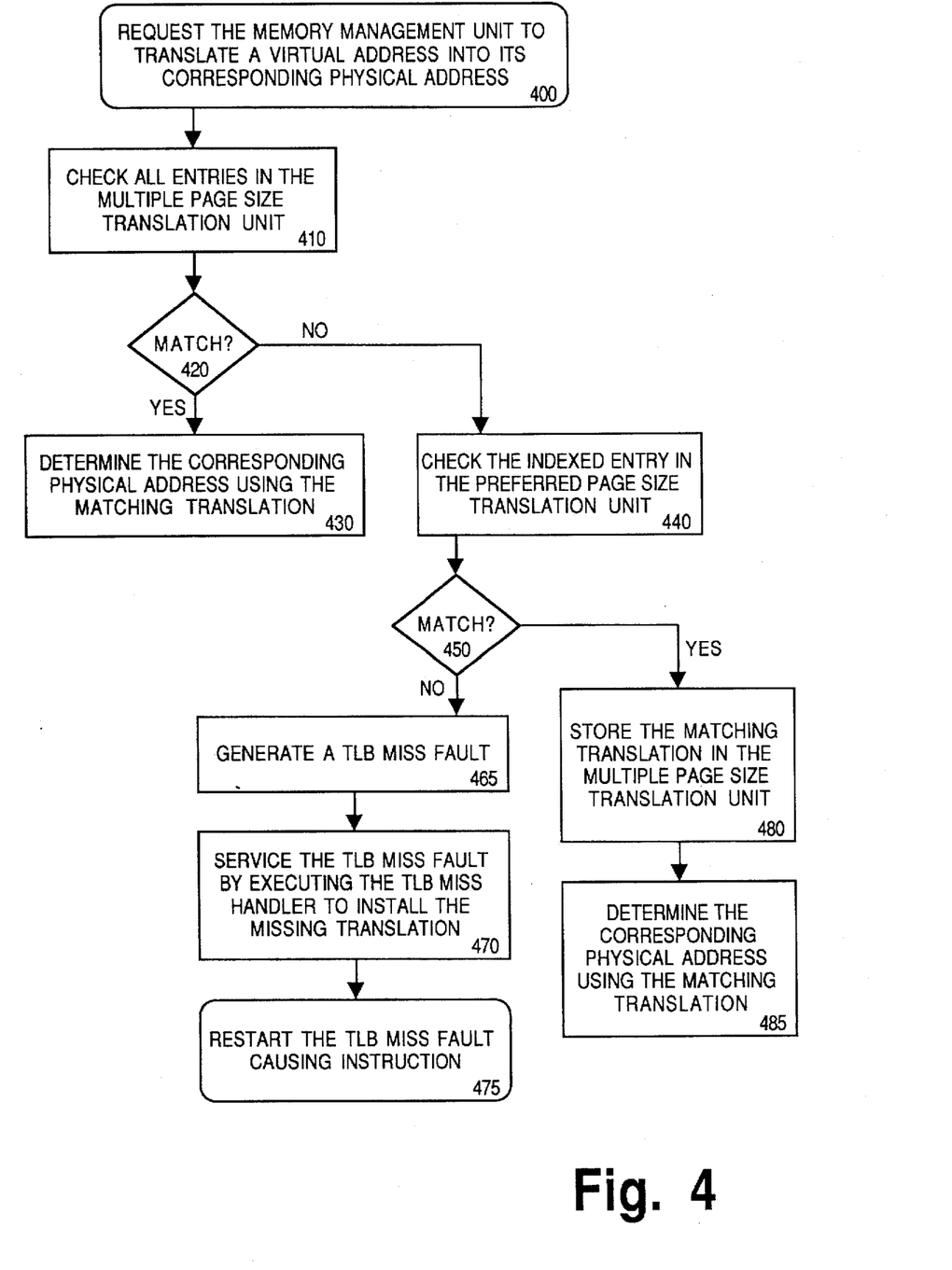
FIG. 4 illustrates a flow diagram of the steps performed by processor 110 upon a request to the memory management unit to translate a virtual address into its corresponding physical address according to on embodiment.

FIG. 4 shows a flow diagram of the steps performed by processor 110 upon a request to the memory management unit to translate a virtual address into its corresponding physical address according to one embodiment of the invention. Starting at step 400, a request is sent to the memory management unit to translate a virtual address into its corresponding physical address. From step 400, flow passes to step 410.

As shown in step 410, the entries in the multiple page size translation unit are inspected to determine if they contain the translation for the virtual address. From step 410, flow passes to step 420.

As shown in step 420, it is determined whether a match was found for the virtual address. If a match was found, flow passes to step 430. Otherwise, flow passes to step 440.

At step 430, the virtual address' corresponding physical address is determined using the matching translation found in the multiple page size translation unit 185.

As shown in step 440, the translation stored in the indexed entry of the preferred page size translation unit identified by the virtual address is inspected. From step 440, flow passes to step 450.

As shown in step 450, it is determined whether the translation stored in the indexed entry of the preferred page size translation unit corresponds to the virtual address requiring translation. If a match was found, flow passes to step 480. Otherwise, flow passes to step 465.

As shown in step 480, the matching translation is stored in the multiple page size translation unit and flow passes to step 485. Thus, in one embodiment, preferred page size translation unit 180 is used as a second layer or level of the TLB. That is, when a miss is detected in the multiple page size translation unit 185, the processor inspects the preferred page size translation unit for the translation. If the preferred page size translation unit contains the translation, it is copied into the multiple page size translation unit 185. This is advantageous because, as previously described, the multiple page size translation unit has a lower capacity for translations than the preferred page size translation unit.

At step 485, the corresponding physical address is determined using the matching translation.

If a matching translation for the virtual address is not found in step 450, step 465 is performed. As shown in step 465, a TLB miss fault is generated and flow passes to step 470. This TLB miss fault is generated and serviced by the event handling mechanism of processor 110. Event handling mechanisms are well known in the art.

As shown in step 470, the TLB miss fault is serviced by executing the TLB miss handler to install the translation for the virtual address. This step will be further described with reference to FIG. 5. From step 470, flow passes to step 475.

As shown in step 475, processor 110 resumes execution of the interrupted process at the TLB miss fault causing instruction (i.e., the instruction which generated the virtual address described in step 400). In so doing, the same virtual address described in step 400 will again be generated and the memory management unit will again be requested to translate the virtual address. However, this time the translation will be stored in at least one of preferred page size translation unit 180 and multiple page size translation unit 185. As a result, flow will pass through the flow diagram and terminate in one of steps 430 and 485 in which the corresponding physical address is determined for the virtual address.

Figure 5:
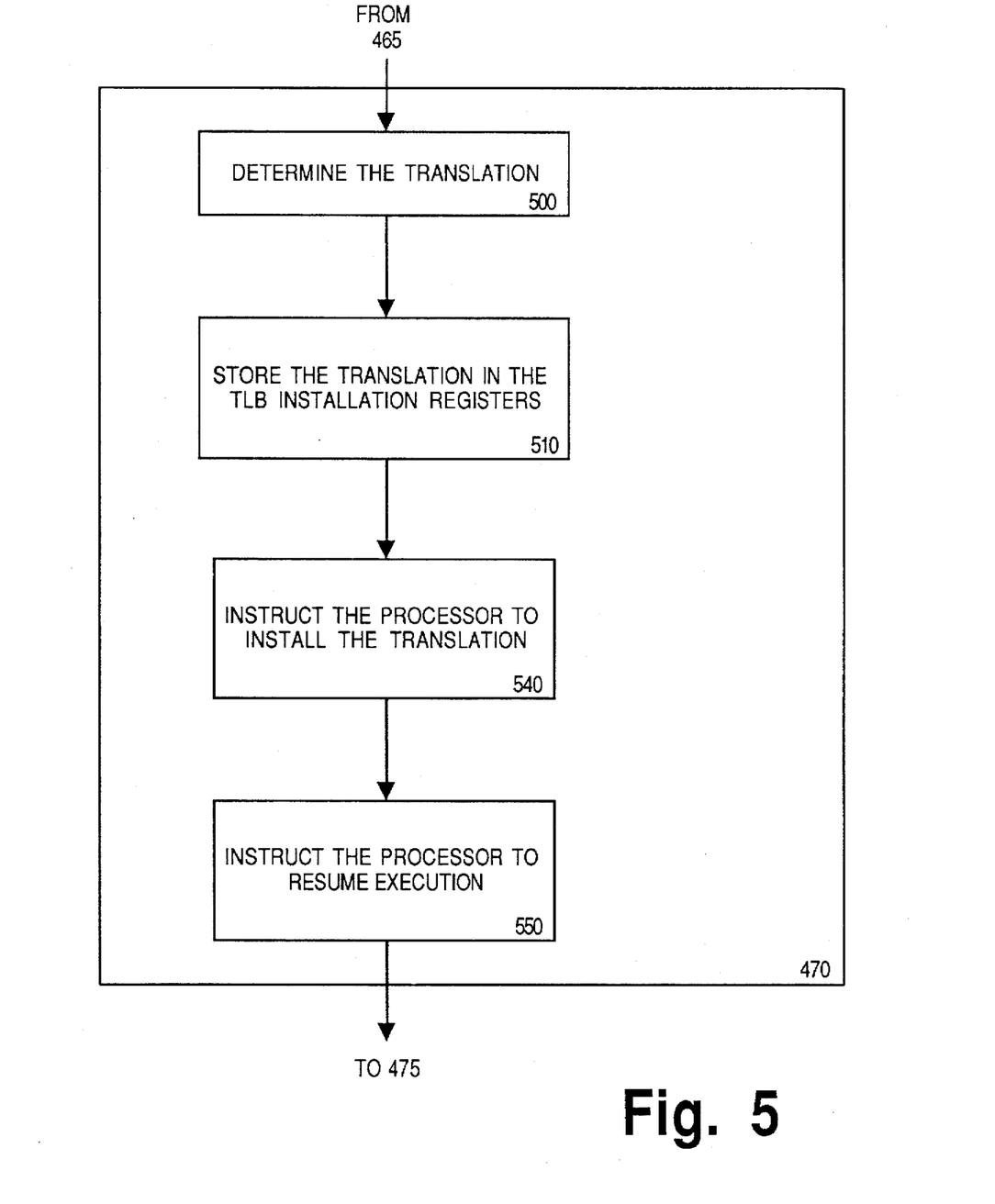
FIG. 5 illustrates a more detailed description of the steps performed in step 470 of FIG. 4 (i.e., the steps performed by the TLB handler)

FIG. 5 shows a more detailed description of the steps performed in step 470 of FIG. 4 (i.e., the steps performed by the TLB handler). From step 465, in which a TLB miss fault is generated, flow passes to step 500.

As shown in step 500, the translation for the virtual address is determined and flow passes to step 510. Methods for performing this determination are well known in the art, and thus, are not further described here so as not to obscure the invention.

As shown in step 510, the translation is stored in the TLB installation registers and flow passes to step 540.

As shown in step 540, the TLB handler instructs the processor to install the translation and flow passes to step 550. In response to receiving this instruction, the processor installs the translation in one or both of the translation units. This step will be further described with reference to FIG. 6.

As shown in step 550, the TLB handler instructs the processor to resume execution of the process interrupted for the servicing of the TLB miss fault. From step 540, flow passes to step 475.

Figure 6:
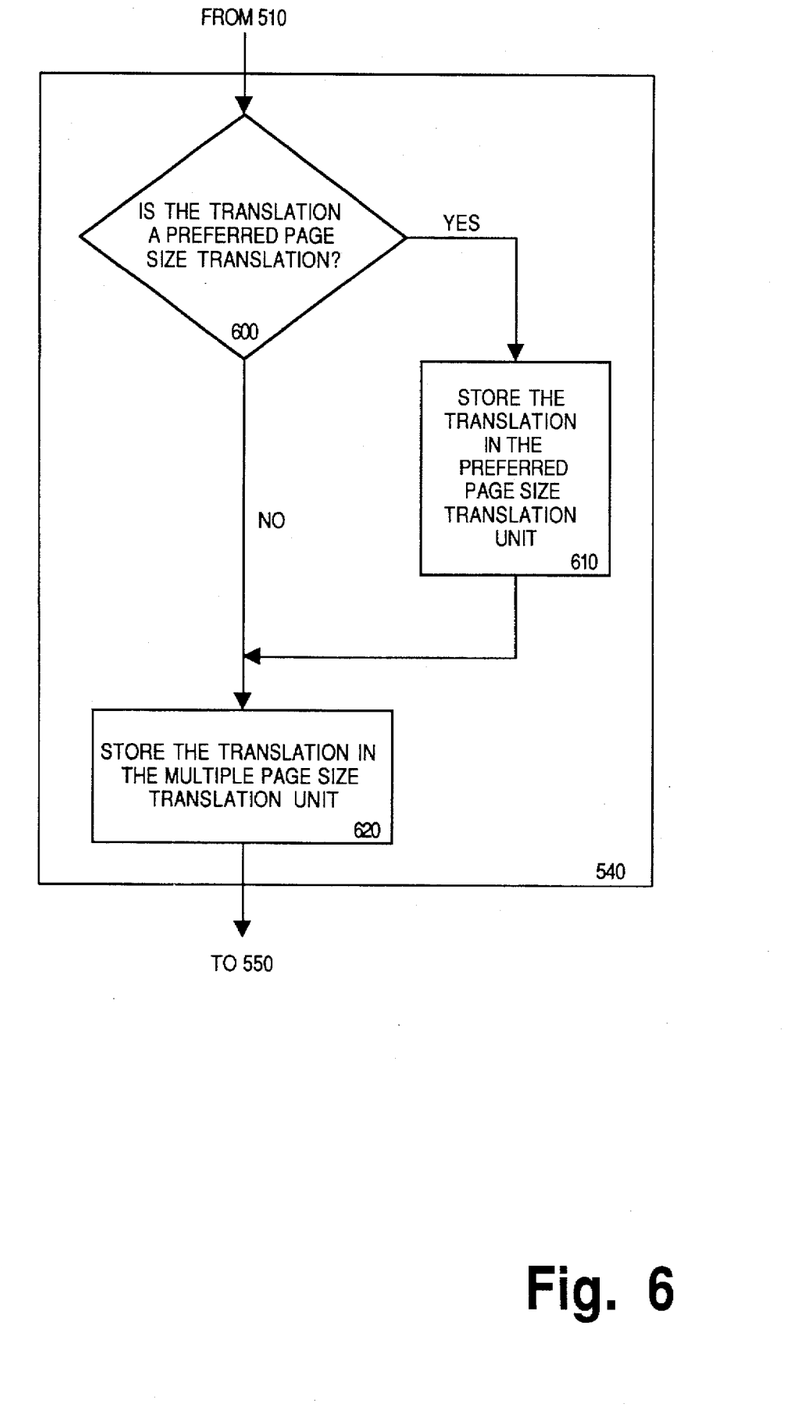
FIG. 6 illustrates a flow diagram further describing step 540 of FIG. 6.

FIG. 6 shows a flow diagram further describing step 540 of FIG. 5. Flow passes from step 510, in which the translation for the virtual address is stored in the TLB installation registers, to step 600.

At step 600, it is determined whether the translation is of the preferred page size. If the translation is of the preferred page size, flow passes to step 610. Otherwise flow passes to step 620. Determining whether the translation is of the preferred page size is a software convention. For example, an operating system could be implemented such that the directory portion of a virtual address identifies which page size the virtual address is located on. Thus, by inspecting the directory portion of the virtual address, it can be determined whether the virtual address is of the preferred page size. While one embodiment is described in which the directory portion of the virtual address is used to determine the page size of the virtual address, alternative embodiments could be implemented to make this determination in any number of ways.

As shown in step 610, the translation is stored in the preferred page size translation unit and flow passes to step 620.

As shown in step 620, the translation is stored in the multiple page size translation unit. From step 620, flow passes to step 550. Thus, if the translation is for the preferred page, the translation is installed in both preferred page size translation unit 180 and multiple page size translation unit 185. However, if the translation is for other than the preferred page size, the translation is only stored in multiple page size translation unit 185. While one embodiment is described in which such translations are stored in both the preferred page size translation unit and the multiple page size translation unit, alternative embodiments could be implemented to install translations corresponding to the preferred page size in only one of these translation units. Again, this translation is stored in both translation units, because preferred page size translation unit 180 is acting as a level two portion of TLB 155.

An Alternative Embodiment of the Invention

In an alternative embodiment, preferred page size cache 340 is replaced with a cache that is implemented to store the translations in a data structure in storage device 120. In one embodiment, this cache uses the output of multiplexor 320 as a hash into this data structure—e.g., the translations are stored starting at a base address and the cache concatenates the output of multiplexor 320 with this base address to form the address of an entry in this data structure. This cache retrieves from the data structure, the virtual address portion and the physical address portion of the translation identified by the index and transmits these values on the address lines represented by line 342 and 344, respectively. The starting address of this data structure could be hardwired into processor 110 or stored in a predefined register by the operating system.

The hardwired portion of this embodiment allows for a high speed of operation, while the software portion allows for a large number of entries to be stored. In this manner, the number of entries which may be stored in the preferred page size translation unit is not limited by the die area on the processor. In addition, using the event handling mechanism has a longer look-up penalty than this embodiment. As a result, this embodiment reduces the look-up penalty for a larger number of the most commonly accessed translations as compared to using the software TLB handler.

Another Alternative Embodiment of the Invention

Figure 7:
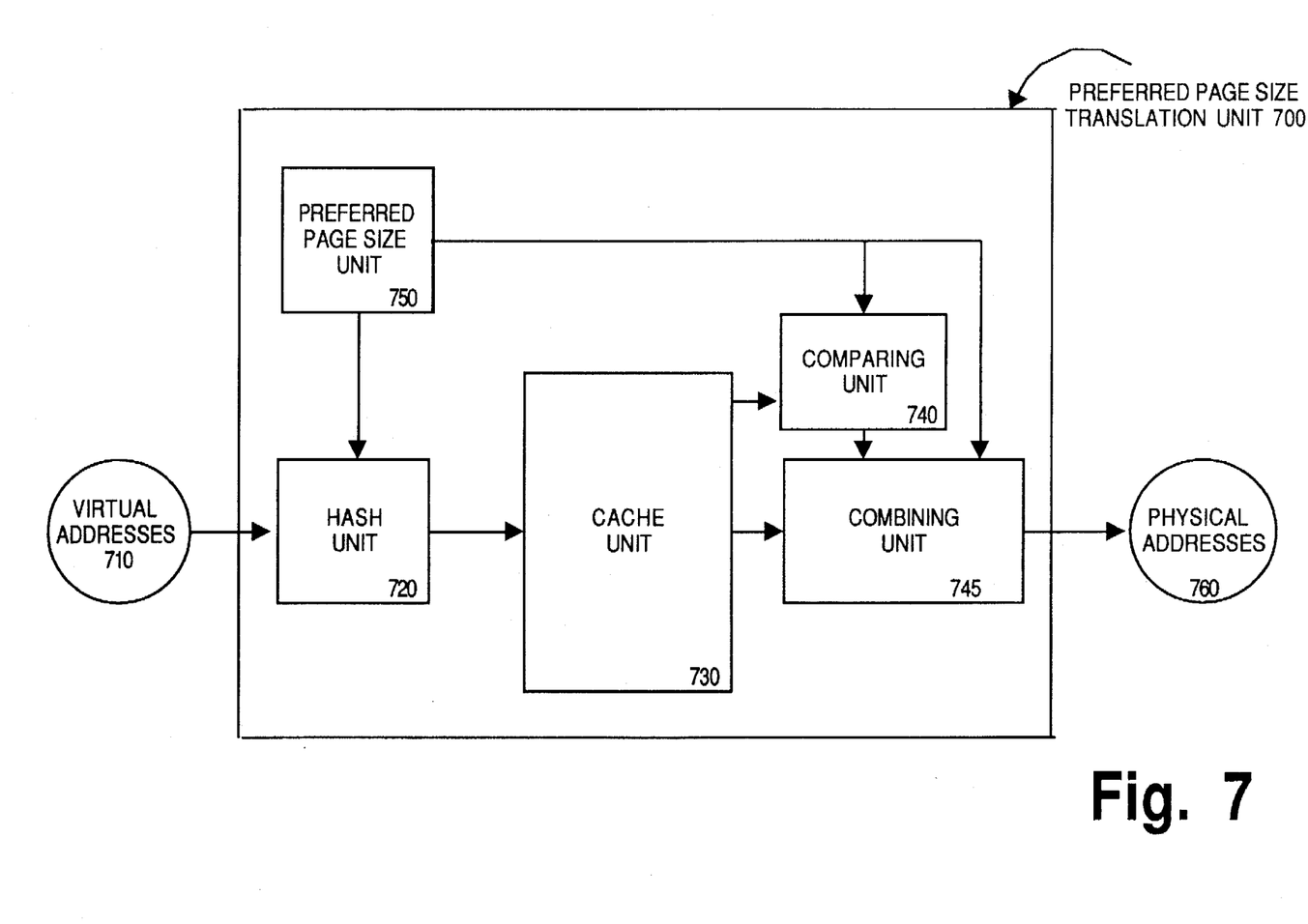
FIG. 7 illustrates an alternative embodiment of the invention in which the preferred page size translation unit is implemented in software.

In another alternative embodiment of the invention, the preferred page size translation unit is implemented in software using software caching. One embodiment of such an implementation is illustrated in FIG. 7 as preferred page size translation unit 700. Preferred page size translation unit 700 would be called as a handler in response to an interrupt. Such an interrupt would occur at step 440 of FIG. 4. Preferred page size translation unit 700 includes a hash unit 720, a cache unit 730, a comparing unit 740, a combining unit 745 and a preferred page size unit 750. Preferred page size unit 750 stores an indication identifying which of the page sizes supported by processor 110 is currently selected as the preferred page size. Thus, preferred page size unit 750 acts as preferred page size indication 175.

FIG. 7 shows that preferred page size translation unit 700 receives virtual addresses 710 into a hash unit 720. Hash unit 720 represents a hash algorithm which acts in a similar fashion to multiplexor 320. Hash unit 720 selects the appropriate portion of virtual addresses 710 to be used as an index into cache unit 730. Hash unit 720 determines which bit locations of virtual addresses 710 to select based upon the input received from preferred page size unit 750 which indicates the currently selected preferred page size.

Cache unit 730 is a software cache whose entries contain preferred page size translations. These entries are stored starting at a base address such that they may be indexed by a portion of a virtual address according to the algorithm implemented in hash unit 720. Upon receiving the index from hash unit 720, the virtual address and physical address portions of the translation stored at the entry identified by hash unit 720 are transmitted to comparing unit 740 and combining unit 745, respectively.

Comparing unit 740 also receives data from preferred page size unit 750 identifying the currently selected preferred page size. Comparing unit 740 acts in a similar fashion to multiplexor 350, inverter 360, AND gate 380, and comparator 382. Thus, comparing unit 740 determines whether the translation received from cache unit 730 corresponds to the virtual address currently being translated. Comparing unit 740 indicates to combining unit 745 whether a matching translation was found.

Combining unit 745 also receives data from preferred page size unit 750 identifying the currently selected preferred page size. Combining unit 745 acts in a similar fashion to multiplexor 350, AND gate 370, and OR gate 390. Thus, if the identified translation does correspond to the virtual address currently being translated, comparing unit 740 also combines the offset of that virtual address with the physical address portion of the identified translation and transmits the resulting physical address to physical address 760. In one embodiment, these physical addresses are stored in TLB installation registers 160 and the processor is instructed to install them in multiple page size translation unit 185.

However, if a matching translation was not found, combining unit 745 communicates as such. In one embodiment, the processor responds to this communication using the event handling mechanism to cause the execution of a multiple page size TLB handler. Of course alternate embodiments could handle this communication in any number of ways, for example preferred page size translation unit 700 could call a multiple page size TLB routine itself.

Since preferred page size translation unit 700 only performs translations for the currently selected preferred page size, it has a lower look-up penalty than a software TLB handler which performs translations for all page sizes. While this embodiment has been described in which each of the units comprising preferred page size translation unit 700 are implemented in software, alternative embodiments could implement one or more of the units comprising preferred page translation unit 700 in circuitry.

Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A translation look-aside buffer comprising:

a first storage area to store a dynamic value identifying a single page size;

a first translation unit to simultaneously store virtual to physical address translations for a plurality of page sizes; and a second translation unit to store virtual to physical address translations for only the single page size identified by said dynamic value.

2. The translation look-aside buffer of claim 1, wherein said second translation unit comprises a set associative cache.

3. The translation look-aside buffer of claim 1, wherein said second translation unit is implemented in software.

4. The translation look-aside buffer of claim 3, wherein said first translation unit comprises a fully associate cache.

5. A computer system comprising:

an execution unit generating a first virtual address and a second virtual address;

a first storage area having stored therein a dynamic value identifying one of a first page size and a second page size;

a first translation unit having stored therein a first translation and a second translation, said first translation for translating said first virtual address into a first translated address identifying a first location in a first page of said first page size, said second translation for translating said second virtual address into a second translated address identifying a second location in a second page of said second page size; and a second translation unit dynamically configured to translate only one of said first virtual address and said second virtual address based on said dynamic value.

6. The computer system of claim 5, said second translation unit comprising a dynamically configurable set associative cache.

7. The computer system of claim 6, wherein said second translation unit is implemented in software.

8. The computer system of claim 5, said first translation unit comprising a fully associative cache.

9. The computer system of claim 5, wherein said first translated address and said second translated address are physical addresses.

10. An apparatus for use in a computer system comprising:

an execution unit to generate virtual addresses;

a first translation unit, coupled to said execution unit, including a fully associative cache to simultaneously store address translations for a plurality of page sizes; and a second translation unit, coupled to said execution unit, including a set associative cache to store address translations for a single page size.

11. The apparatus of claim 10 further comprising:

a storage area to store a dynamic value identifying the single page size, said second translation unit coupled to said storage area and being responsive to support the single page size identified by said dynamic value.

12. The apparatus of claim 10, wherein said plurality of page sizes includes said single page size.

13. A computer system comprising:

a processor;

a storage device coupled to said processor;

a translation look-aside buffer comprising:

a first translation unit, in said processor, to simultaneously store virtual to physical address translations for a plurality of page sizes, and a second translation unit to store virtual to physical address translations for only a single page size in said storage device; and a TLB miss handler, in said storage device, coupled to said translation look-aside buffer.

14. The computer system of claim 13 further comprising:

a storage area to store a dynamic value identifying the single page size, said second translation unit coupled to said storage area and being responsive to support the single page size identified by said dynamic value.

15. The translation look-aside buffer of claim 13, wherein said first translation unit comprises a fully associate cache.

16. The translation look-aside buffer of claim 13, wherein said plurality of page sizes includes said single page size.

17. A method for translating a virtual address into a physical address, said method comprising the computer-implemented steps of:

configuring a first translation unit to provide virtual to physical address translations for a single page size;

determining if a translation for said virtual address is stored in said first translation unit or a second translation unit, said second translation unit providing virtual to physical address translations for multiple page sizes;

if said translation is not in either said first translation unit or said second translation unit, then executing a translation look-aside buffer miss handler; and translating said virtual address into said physical address using said translation.

18. The method of claim 17, wherein said step of determining if a translation for said virtual address is stored in said first translation unit or said second translation unit further comprises the step of:

searching for said translation in a table stored in a storage device coupled to a processor to determine if said translation is stored in said first translation unit.

19. The method of claim 17, wherein said step of determining if a translation for said virtual address is stored in said first translation unit or said second translation unit further comprises the step of:

searching for said translation in said first translation unit; and searching for said translation in said second translation unit only if said translation is not found in said first translation unit.

20. The method of claim 17 further including the step of:

installing translations for the single page size in both the first and second translation.

* * * * *